UNITED STATES PATENT OFFICE.

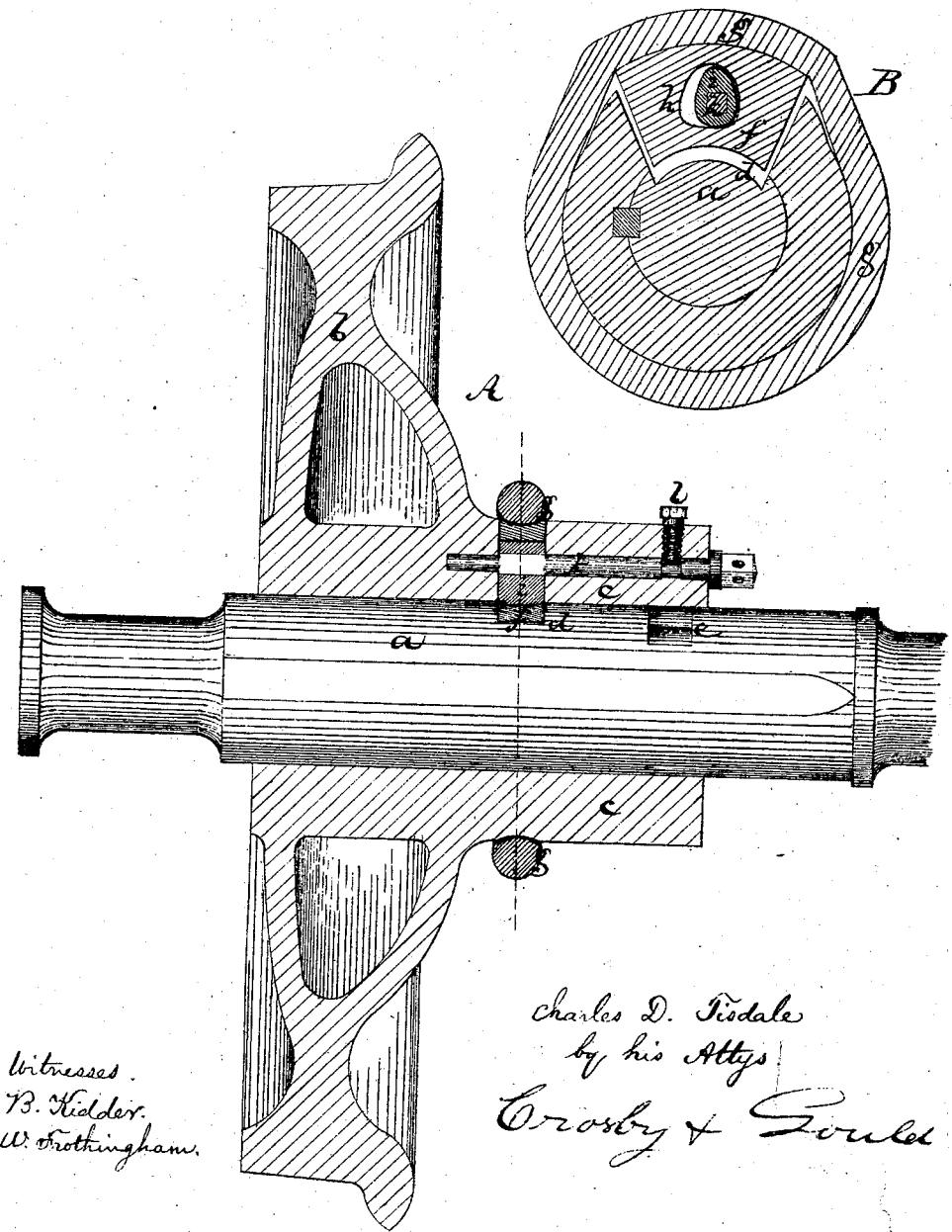

CHARLES D. TISDALE, OF BOSTON, MASSACHUSETTS.

IMPROVEMENT IN CHANGEABLE-GAUGE CAR-WHEELS AND AXLES.

Specification forming part of Letters Patent No. 118,170, dated August 15, 1871.

*To all whom it may concern:*

Be it known that I, CHARLES D. TISDALE, of Boston, in the county of Suffolk and State of Massachusetts, have invented an Improvement in Changeable Wheels and Axles for Wide and Narrow-Gauge Railways; and I do hereby declare that the following, taken in connection with the drawing which accompanies and forms part of this specification, is a description of my invention, sufficient to enable those skilled in the art to practice it.

In the use of wide and narrow-gauge railway tracks and of cars running from track to track having sliding wheels which are automatically changed or brought to position for either track, by change-rails connecting one track with the other, and as the cars run over such tracks there have been used, to greater or lesser extent, axles having lateral grooves cut into them and wheels sliding upon such axles with lateral chocks or bolts, which confine the car in either position by entering such grooves. My present invention relates to a peculiar construction or combination of a chock-bolt and an operating-key, the chock extending through the hub-sleeve, and being held, preferably, to the axle by the stress of a ligature-spring, and having a key extending into it parallel with the axle, said key rotating in the sleeve, and having upon it, in a radial plane with the chock, an eccentric or cam which extends into or through the chock, so that by rotative movement of the key the chock may be raised from the axle-groove and held in position to allow the wheel to slide on the axle until the chock comes opposite the other groove, when, by the action of the spring, or by turning the key, (but preferably by the action of the spring,) the chock is thrown down into the last-named groove and locks the wheel in position or from end movement. My invention consists in the combination of a sliding-wheel chock, chock-operating key or shaft, and a bit and slots in the axle, when the key is located in the hub or hub-sleeve and is wholly inclosed by such hub or sleeve, except at its head, all as hereinafter more particularly set forth.

The drawing represents in central cross-section and elevation, and in section on the line *x x*, a car-wheel embodying the invention.

*a* denotes the axle; *b*, the wheel, made with a hub-extension or sleeve, *c*, at its inner side. The hub and axle are splined together, and the hub slides upon the axle to bring the wheel into position for either a wide or narrow-gauge track, the axle being made with two grooves, *d e*, on one side of it, and the hub being provided with a chock or bolt-plate, *f*, which extends through the hub and into the groove *d* or *e*, and is held in place by a ligature-spring, *g*, withdrawal of the chock from the groove enabling the wheel to be slid to bring the chock over the other groove, into which it is thrown by the action of the spring. The chock is made with a hole, *h*, through it, and into this hole is entered a bit or cam, *i*, on a stem or key, *k*, this key extending into or through the hub-sleeve, as seen at A, and turning therein, and by its rotative movement causing its bit or cam to lift or force outwardly the chock, so as to carry the inner end of the chock back into the hub-sleeve, which, being done, the wheel can be slid upon the axle until the chock comes into the plane of the other groove, into which it will slip if free to be actuated by the spring, or into which it may be slipped by turning the key.

The key may be kept in place by a screw, *l*, the point of which extends into a notch in the key-shank, or by the bit or cam into which it is driven, or it may be inserted when the chock is to be thrown out from either axle-groove. I prefer, however, its arrangement substantially as seen in the drawing, so that it shall always be accessible, and so that by its slight axial turn the chock can be forced from either groove when the car is to be changed from one track to another, the key being preferably turned back after the chock has slid slightly by either groove, in which case the spring will force it, the chock, into position to lock the wheel and axle together when the chock comes opposite the other groove.

The chock may be made with inclined opposite edges, as seen at B, or with parallel edges, and the hub-sleeve is preferably made thicker at the chock and key-containing part, as seen at A and B.

The axle may have more than the two grooves, (for more than the two track-gauges,) or a series of chocks and grooves to correspond. The axle is preferably enlarged in diameter in the groove-containing part, over which the wheel slides, and it may be made with a slotted steel or other metal spline let into it, or with spline-pieces let into it, with spaces between for entrance of the chock.

By the arrangement shown and described it will be obvious that the parts are always in position to be operated at proper times, that there are no removable parts that are liable to become detached and lost, and that the manipulation necessary to put the parts in position for change of the wheel is very simple. It will also be seen that the spring *g* never has to be slipped from the chock, but is always in position to keep the chock in place.

The key may be square-headed and turned by a suitable wrench, or may have capstan-holes, enabling it to be turned by a suitable lever.

I do not claim as of my invention a notched or slotted axle, the ligature, nor a fastening-chock; nor do I claim the construction and arrangement of devices shown in the application of Perley Putnam.

I claim—

The combination of the sliding wheel *b*, the chock *f*, the chock-operating key or shaft *k*, bit *i*, and the axle-slots *d e*, when the key is located in the hub or hub-sleeve *c*, and is wholly inclosed by such hub or sleeve, except at its head, as shown and described.

Executed February 2, 1871.

C. D. TISDALE.

Witnesses:
 FRANCIS GOULD,
 S. B. KIDDER.